May 21, 1946. D. JOHNSTON 2,400,555
BALER
Filed May 13, 1942 4 Sheets-Sheet 1

Inventor
Douglas Johnston
By
Alois W. Graf
Atty.

May 21, 1946.   D. JOHNSTON   2,400,555
BALER
Filed May 13, 1942   4 Sheets-Sheet 3

Inventor:
Douglas Johnston
BY:
Alois W. Graf
Atty.

Patented May 21, 1946

2,400,555

UNITED STATES PATENT OFFICE 2,400,555

BALER

Douglas Johnston, Shelbyville, Ill., assignor, by mesne assignments, of thirty per cent to Leslie R. Tallman, forty-five per cent to G. L. Tallman, twelve and one-half per cent to J. L. Tallman, and twelve and one-half per cent to Emma S. Tallman Application May 13, 1942, Serial No. 442,877

16 Claims. (Cl. 100—20)

My invention relates to balers and more particularly to means for automatically passing or threading wire about a bale in a baler.

In balers for straw or hay now commonly in use blocks or division boards are used between the ends of the bales so that wire may be threaded manually about the bale. Each block is provided with grooves through which the wire is readily passed by one man on one side of the bale case or frame to another man on the other side of the bale case. Thus when a new bale is being formed the first man passes several wires through the grooves in the division board to the second man on the other side, who takes the ends of the wires and pulls the wires up to the other end of the bale. There the second man passes the ends of the wires back to the first man who has retained the other ends of the wires, and then he ties the ends of each wire together. This method of binding the bale is so laborious and slow that the average speed of baling is but one or two bales per minute for two men. Another disadvantage of this method of baling is that considerable skill is required to handle the division boards without excessive breakage since these boards are quite expensive. It is particularly true in the operation of combine hay and straw balers that skillful timing of the insertion of the division blocks must be had in order to keep up with the operation of the machine.

In order to simplify the process of binding bales of hay, straw or other material, it has been proposed automatically to wrap twine about the bale and to bind it much in the manner of a grain binder. Bales of hay or straw however are so heavy that even by using a heavy twine, the binding will not hold and hence a considerable number of bales must be lost. In the storage of such bales the twine deteriorates so as to be weakened and frequently insects and rodents destroy the twine binding so that the bale cannot be handled. Due to these disadvantages, others have endeavored to bind automatically bales of straw or hay with wire, but such machines have not been practical commercially because of their complexity, of the delicate mechanisms, of the need for frequent adjustment and repair, and because of the great initial cost.

Accordingly it would be desirable, especially at the present time when man power is so valuable, to provide some method and apparatus for reducing the labor required in operating baling presses, and particularly in the case of combine hay and straw balers. In accordance with my invention this objective may be obtained without the use of delicate mechanisms, gears, cams, toggles, splines, or other complicated or expensive parts which might require frequent adjustment or repair. This is accomplished by an automatic mechanism which receives the ends of baling wires when a new bale is to be formed and which threads the wires across one end, along one side and back across the other end of the bale so that a single operator on one side of a bale case can easily double the speed of operation as compared to the former type of baling press and combine balers requiring an operator on each side of the bale case.

Therefore it is an object of my invention to provide a threader means for a baler or a baling press for passing wire about a bale of material, and which will be simple and reliable in operation.

Another object of my invention is to provide an improved apparatus for securing or binding bales of material with wire.

Still another object of my invention is to provide in a baler, means for actuating threader means in response to the formation of and to the completion of a bale.

Still another object of my invention is to provide an improved baler having a source of power for the actuating means of a threader member, and means coordinating the effectiveness of the source of power with the operation of the compressing plunger of the baler.

A further object of my invention is to provide in a baler, a self reversing actuating means for threader members which will operate each time for a period until just after said means has begun to reverse its direction of operation.

A further object of my invention is to provide a baler having threader means for automatically passing binding wire or metal binding strips about a bale and for relieving the tension of the wire so that the binding wire may be released manually from the threader.

A still further object of my invention is to provide an improved baling press having threader members which will pass wire about the bale without incurring appreciable friction between the threader and the wire.

Still another and further object of my invention is to provide an improved baler which will reduce the manual effort heretofore required and which will have a higher rate of operation.

Other and further objects of my invention will become more readily apparent by reference to the following description taken in connection with the accompanying drawings wherein: Fig.

1 is a side view of a hay and straw combine baler which incorporates my invention.

Figure 1:
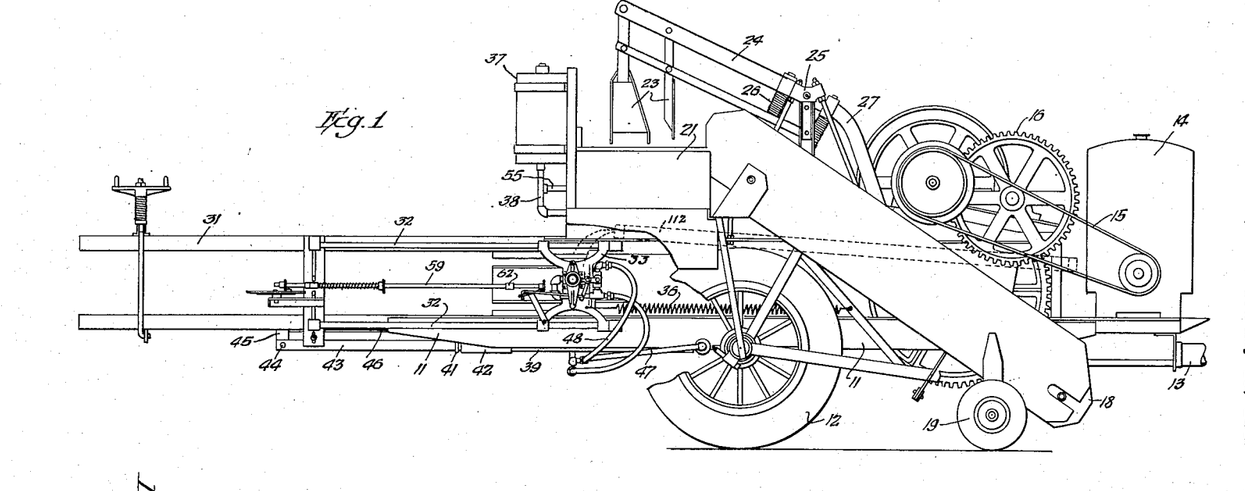
Figure 2:
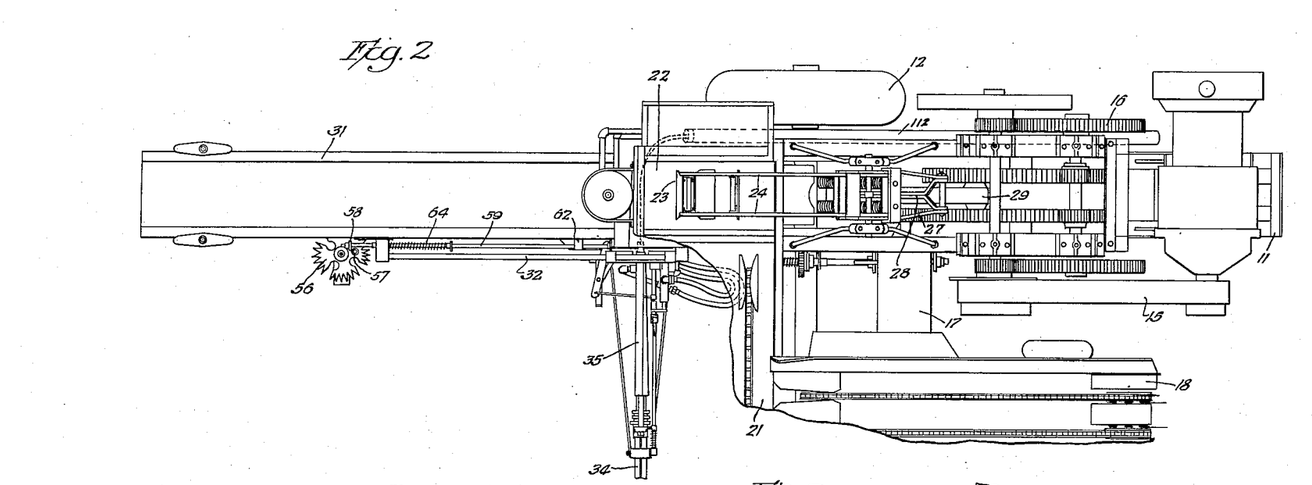
Fig. 2 is a top view of the apparatus shown in Fig. 1.

Referring more particularly to Figures 1 and 2 of the drawings, there is shown a baling press of the type commonly known as a hay and straw combine baler. This baler has a frame 11 suitably supported from a wheel and axle assembly 12 positioned at an intermediate point on the frame 11. At the forward end of the frame 11 there is attached a draw bar 13 which may be connected to a suitable source of motive power such as a tractor. Adjacent the front end of the frame 11 there is mounted an internal combustion motor or engine 14 which by means of a suitable belt 15 drives a reduction gear assembly 16. The reduction gear assembly is connected through power transmission means contained in a housing 17 to actuate the pick-up elevator 18 of the combine baler which has its front end supported by suitable wheels 19. The pick-up elevator 18 picks up the hay or straw and delivers it to a transversely positioned conveyor 21 which in turn delivers hay or straw to a compression chamber 22. The hay delivered into the compression chamber 22 is tamped down by a tamper assembly 23 which is mounted adjacent the end of a driven lever 24. The driven lever 24 is pivoted upon a support 25 mounted on the frame 11. The driven lever 24 is resiliently connected by mean of a spring assembly 26 to a driving lever 27 which in turn is connected to a link 28 connected to a connecting rod 29. The connecting rod 29 interconnects certain gears of the gear reduction assembly 16 and a compressing plunger 20 positioned to operate in a compression chamber 22. Since baling presses of this type are well-known in the art, for a more complete understanding of the structure and operation thereof, reference may be made to United States Letters Patent No. 2,068,886, patented January 26, 1937, upon the application of Raymond D. MacDonald, which application was assigned to the assignees of the present application.

Supported by the other extremity of the frame 11 and extending longitudinally to the rear from the frame and the compression chamber 22 there is a bale case or frame 31 which is provided with an apparatus for threading baling wire around a bale of material in accordance with my invention. This apparatus is mounted on one side of the bale case 31 and it comprises a pair of guide rails or rods 32 upon which a threader assembly may travel along a portion of a bale chute 31. Supported from the guide rails 32 there is a suitable supporting frame 33 which supports the threader assembly including an automatically self-reversing hydraulic actuating mechanism 34 which is connected to operate a plurality of shuttle-like threader members 35. This actuating means 34 operates to move the threader members 35 across the bale chute 31 at the time when a new bale is about to be formed. The action of the compressing plunger 20 within the compression chamber 22 is such that the compressed hay engages the threader members 35 thereby causing the supporting frame 33 and the assembly connected thereto to be moved toward the rear end of the guide rails 32. At a predetermined point in the travel of this assembly toward the rear which is in the vicinity of the rear ends of the guide rails 32, means responsive to the formation of the bale causes the actuating means 34 to withdraw the needle-like threader members 35 from across the bale frame or chute 31. When these threader members are withdrawn, the support frame 33 is returned to its original position by the action of a spring 36.

The automatic self-reversing hydraulic actuating means 34 for the threader members 35 is supplied by power from a source of power including an oil tank or reservoir 37 which has a pipe or fluid passage 38 connected to a pump cylinder 39 mounted underneath the rear end of the frame 11. The pump 39 is provided with a packing gland 41 and a stuffing box 42 to form a seal between the cylinder 39 and the displacement piston 43. The piston is actuated from means connected to the reduction gear assembly 16 and one manner of accomplishing this is to provide a connection actuated by the compressing plunger 20 of the chamber 22 by means of a bolt 44, a connecting lug 45, and a flat bar 46 which is directly connected to the piston. This arrangement of the hydraulic pump which obtains fluid through the pipe or conduit 38 from the reservoir 37 is such that power is supplied by the pump only during the time of a non-compressing stroke or after a compressing stroke of the plunger 20. The hydraulic pump is connected to supply fluid through the conduit 47 which is connected to a flexible conduit 48 to a control valve 49. The control valve 49 is connected to a lever linkage comprising the levers 51, 52, and 53 which are arranged so as to be responsive to the formation of and to the completion of a bale of material. The valve 49 is arranged to permit the fluid from the pump through the hose 48 to be transmitted to the hydraulic actuating means 34 and to be returned through a hose 54 and a fluid conduit 55 to the fluid or oil reservoir 37 without appreciable loss of energy. In other words, the hydraulic pump is intermittently effective to supply power since during the times that it is not supplying power to the hydraulic actuating means 34 the pump is doing no work. The details of the structure and operation of the valve 49 will subsequently become apparent.

In order that the valve 49 may be actuated in response to the formation of and in response to the completion of a bale of material there is provided a spiked wheel 56 mounted so as to project into the path of bales of hay or straw passing down the bale case 31. On the surface of the spiked wheel 56 there is provided a stud 57 which will engage a collar or dog mounted adjacent one end of a rod 59 which is supported longitudinally of the bale frame or case 31. The rod is supported by suitable bearing members 61 and 62 so that the rod may be reciprocated. The rod 59 is provided with a collar or dog 63 positioned at an intermediate point on the rod, and a spring 64 is mounted between the bearing 61 and the dog 63 so as to bias the rod in a direction toward the front of the baling press. At the other end of the rod 59 there is provided a collar or dog 65 which will engage the end of the lever 53 whenever a bale has been completely formed. This action occurs when the spiked wheel 56 has been rotated sufficiently so that the stud 57 engages the collar or dog 58 at the end of the rod 59 thus moving the rod toward the rear of the baler, and causing the dog 65 to engage the end of the lever 53 thereby tripping the valve 49 by means of the linkage including the levers 51 and 52. The rod 59 is limited in its forward movement due to the spring 64 by a stop collar 66 secured thereto so as to engage the end of the bearing 61. When the spiked wheel 56 has passed a predetermined point, the stud 57 will clear the dog or collar 58 thereby permitting the rod 59 to return to its original position as determined by the action of the spring 64 and the stop 66.

Figure 3:
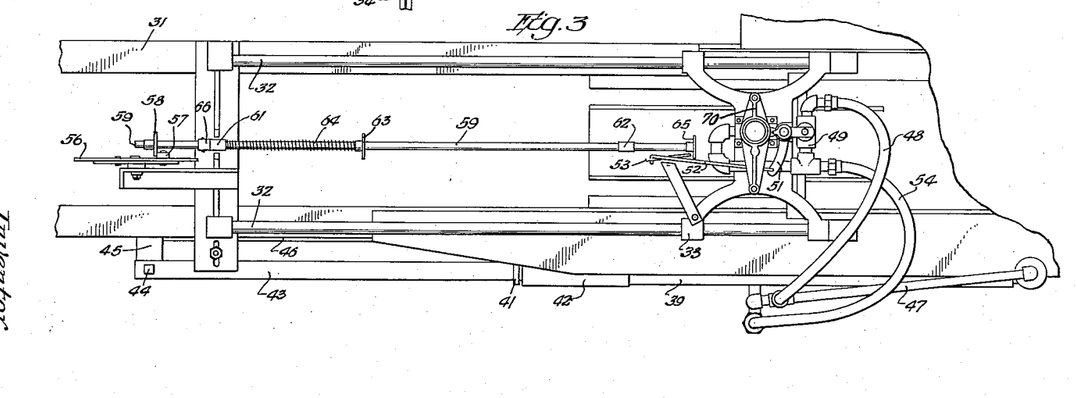
Fig. 3 is an enlarged side view of a portion of the threader assembly constituting my invention.
Figures 4, 8, 9:
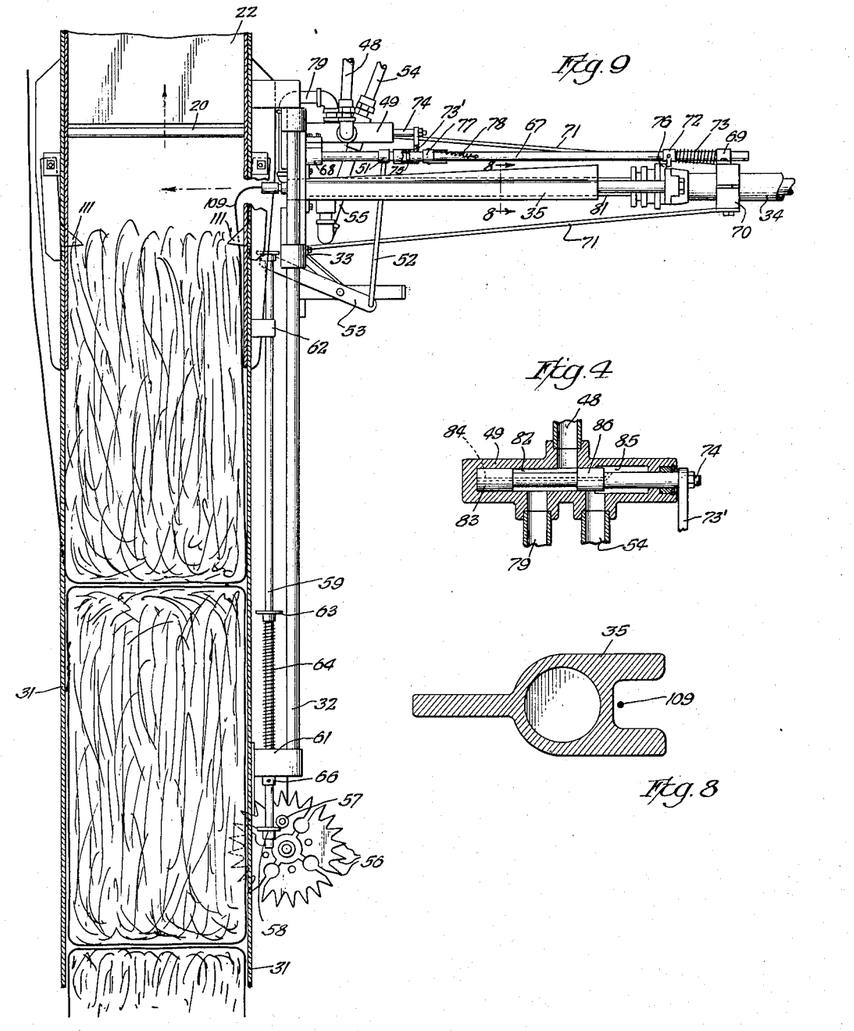
Fig. 4 is a cross section of a valve used in the threader assembly.
Fig. 8 is a cross section of the threader member along the line 8—8 of Fig. 9.
Figs. 9 and 10 show the bale case and the threader assembly in various positions to illustrate the cycle of operation.
Figures 5, 6, 7, 10:
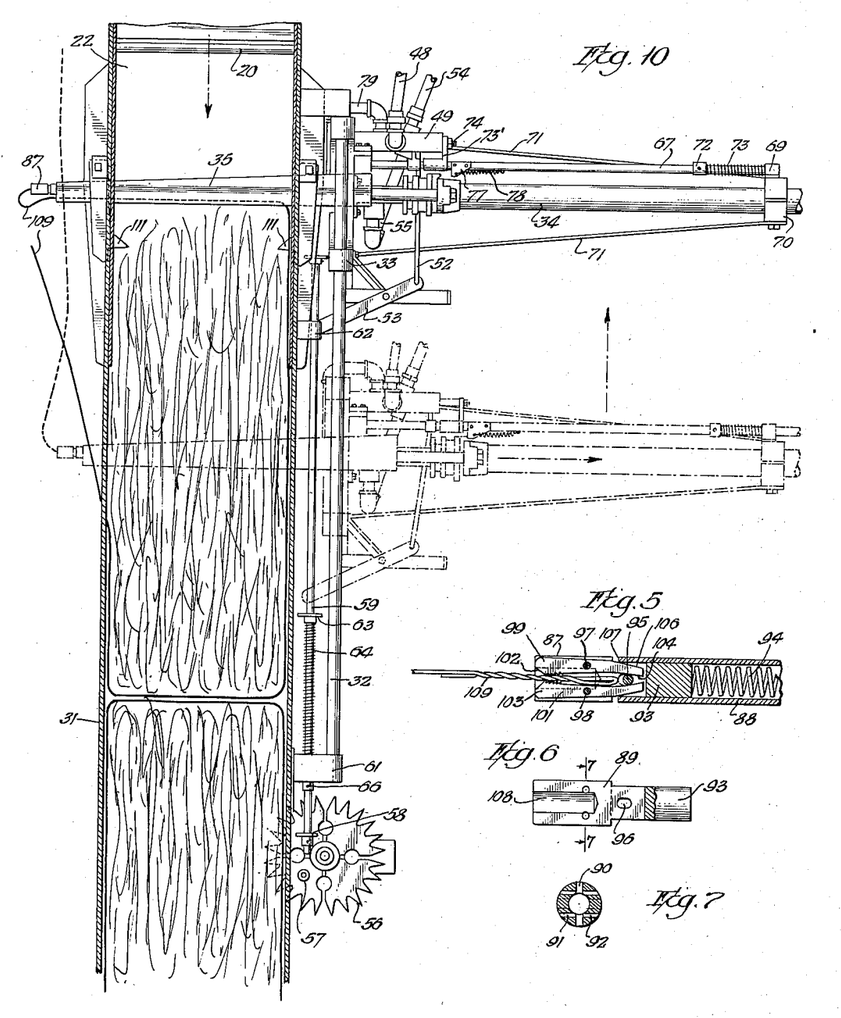
Fig. 5 is a cross section view of the wire chuck and a portion of the threader.
Fig. 6 is a detailed view of one element of the wire chuck of Fig. 5.
Fig. 7 is a cross section view of the member shown in Fig. 6 taken along the line 7—7.

By referring to Figures 3, 9, and 10, it will be seen that the support frame 33 mounted upon the guide rods 32 which extend along one side of the bale chute or frame 31 supports the threader members 35 and the hydraulic actuating means 34 therefor. The hydraulic actuating means 34 comprises an automatic self-reversing hydraulic motor which preferably is of the type shown, described and claimed in the United States Letters Patent Re. 21,789, reissued May 13, 1941, upon the application of the present inventor, original Patent No. 2,128,048, dated August 23, 1938. This hydraulic motor is so constructed that as long as the fluid pressure is supplied to the motor, the motor will continue to operate reciprocatingly, since this motor is a double acting hydraulic motor having valves contained therein automatically actuated to control the reciprocation of the motor parts. The hydraulic actuating means 34 in the present instance, however, does not receive a continuous supply of fluid pressure due to the controlling action of the valve 49 which permits the hydraulic source of power comprising a hydraulic pump to be only intermittently effective. Furthermore, the power supplied by the pump is of intermittent action since the pump supplies power only during the non-compressing period of the compressing plunger 20 of the compressing chamber 22.

Previously it was stated that the lever 53 operating upon the levers 52 and 51 controlled the operation of the valve 49. It will be seen that the lever 51 is secured to a rotatable shaft 67 which is mounted so that one end thereof is supported in a suitable bearing member 68 secured to the support frame 33 and the other end thereof is mounted in a bearing member 69 supported by a support 70. The support 70 is held in position by suitable brackets or braces 71 fastened to the frame or support 33, and the support 70 serves as a bearing for the automatically reversing hydraulic actuating mechanism 34. The shaft 67 is furthermore provided with a dog 72 secured thereto adjacent the end of the shaft at the bearing 69. A spring 73 is mounted to surround the shaft between the dog 72 and the bearing 69 so as to bias the shaft in a direction toward the bale chute. The shaft or trip rod 67 has keyed thereto a connecting member 73' which is secured to one end of a valve rod 74 of the hydraulic valve 49. Thus longitudinal movement of the trip rod 67 will produce displacement of the valve rod 74 thereby to control the valve 49. The connecting member 73' does not partake of the rotational movement of the trip rod 67 but only of the longitudinal movement thereof since the member 73' is keyed to the rod by a set screw or key 75 positioned in an annular recess in the trip rod or shaft 67. The dog 72 adjacent to the end of the trip rod 67 is positioned so as to engage a cylinder dog 76 mounted at one end of the hydraulic actuating means 34. Rotation of the shaft 67 thereby causes the dog 72 to be moved so that it clears the cylinder dog 76 thus permitting the spring 73 to move the trip rod 67 toward the bale chute. The cylinder dog 76 at certain positions of the operating mechanism also engages a trigger dog 77 pivotally mounted on the trip rod 67 at an intermediate point in the vicinity of the connecting member 73'. A suitable spring 78 is provided to return the trigger dog 77 to a position where the trigger dog 77 will be engaged by the cylinder dog 76 after the cylinder dog has passed beyond the dog 77 when the actuating means 34 is moving the threader members 35 across the bale frame or chute 31.

The control valve 49 will be better understood by reference to Figure 4 wherein fluid supplied by the power source or pump enters into the valve through the conduit 48. The return conduit 54 is a low pressure return which is connected to return the fluid to the fluid or oil reservoir. Another outlet 79 is provided so that fluid passing through the valve is connected to the hydraulic actuating means 34. The outlet 79 and connecting fluid passage is in communication with the end of the hollow piston rod 81 which extends from the frame 33 to a point in the vicinity of the support 70.

In the position shown in Figure 4 the valve rod 74 permits communication between the conduits 48 and 79 thereby permitting fluid power to be transmitted to the reciprocating motor 34 since the valve rod 74 is provided with a recessed annulus 82. The fluid returning from the hydraulic actuating means passes from the conduit to the oil reservoir 37. When the valve rod 74 is actuated to the other position to the right, it will be seen that the fluid conduits 48 and 54 are in communication. The solid piston end 83 of the valve rod will be positioned so as to close the part communicating with the fluid passage 79. As the valve rod 74 is moved from right to left the cylinder to the left of the piston end 83 will have accumulated oil therein which if not allowed to escape would prevent operation of the valve. In order to permit this accumulation to escape there is provided a vent 84 drilled so that the cylinder to the left of the piston end 83 in the valve rod 74 is in communication with an annulus 85 in the right hand portion of the valve structure 49. The annulus 85 is larger than the piston end 84 of the rod 74 so that there always is communication with the outlet passage 54 thereby preventing any pressure or resistance from being built up at either end of the valve 49.

The end of each of the threader members 35 is provided with a chuck 87 for receiving and for retaining until released the end of a baling wire. The operation and the structure of the chuck 87 will become more apparent from the following description taken in connection with the Figures 5, 6, and 7. The chuck 87 is supported by a hollow member 88 which may be of any configuration, preferably cylindrical in form. The chuck 87 has a member 89 having longitudinal slot 90 therein, to form bifurcated portions 91 and 92, extending through a major portion of the member 89. The other end of the member 89 is provided with a solid portion 93 having a configuration complementary to the inside of the support member 88; and the end of the member 93 is acted upon by a suitable spring 94 mounted within the support 88. The member 89 is secured in the support 88 by a pin 95 fastened in the support 88 and passing through an elongated aperture 96 located adjacent to the bottom of the slot 90 and in a direction transverse with respect thereto.

Positioned within the slot 90 there is a pair of levers pivotally supported in a common plane by suitable fastening means such as bearing pins 97 and 98. These levers 99 and 101 are each provided adjacent one end thereof with jaw members 102, 103 and at the opposite ends with portions extending beyond the fastening means 95. Each of these ends is provided with an inner surface such as 104 adapted to engage the pin 95 thereby to force a gripping or closing action of the jaw portion and with an outer surface such as 106 adapted to engage the extremity 107 of the support 88 whenever the chuck is moved against the action of the spring 94. In order to facilitate the insertion of the end of a wire for baling purposes it may be desirable to provide the bifurcated end with a concentric recess or opening 108. Whenever it is desired to insert the wire into the end of a chuck the member 89 is manually moved against the action of the spring 94 so that the outer surface 106 of the levers 99 and 101 will engage the outer extremity of the support 88 thereby forcing apart the cooperating jaw portions 102 and 103. Upon insertion of the wire the chuck is released whereupon the action of the spring 94 against the end 93 forces the member 89 outwardly so that the fastening pin 95 engages the surface 104 to cause the jaws to engage the wire. Any further outward move of the chuck away from the support 88 serves to increase the biting action of the jaw portions 102 and 103 and hence the strain on the baling wire such as 109 serves to increase the gripping action on the end of the wire.

By reference to Figures 8, 9, and 10, it will be noticed that each threader member 35 is tapered so that the threader may be readily withdrawn from the bale chute. This tapered structure has a great advantage over a straight structure since the friction of the hay or straw against the shuttle or needle-like threader member becomes less as the threader member is removed. The threader member 35 has a cross section such as shown in Figure 8 which provides a channel portion on the back side of the threader member 35 wherein a wire 109 may lie when the wire is moved around the end of a completed bale. Thus the channel formation provides a structure which eliminates the possibility of friction between the baling wire and the threader member.

The operation of the above described invention will be best understood by reference to Figures 9 and 10. In Figure 9 the formation of the bale is substantially complete so that the following stroke of the compressing plunger 20 will advance the bale being formed so that the spiked wheel 56 will have rotated sufficiently to cause the stud 57 mounted therein to engage the dog 58 on the shaft 59 so as to move the shaft against the action of the spring 64. The movement of the shaft 59 at that time will then cause the dog 65 at the end thereof to engage the end of the lever arm 53 thereby swinging the lever arm toward the position shown in Figure 10. The action of the dog 65 against the lever 53 is such that levers 52 and 51 are actuated thus producing rotation of the trip rod 67 so as to release the dog 72 from engagement with the stop member 76. The release of the dog 72 from the stop member permits the spring 73 to longitudinally move the trip rod 67 so that the arm 73' attached to the valve rod 74 will bring about an actuation of the control valve 49. The rod 74 thereupon will be moved to the position shown in Figure 4 thus causing the fluid supplied by the source of hydraulic power through the inlet conduit or hose 48 to pass to the conduit 79 which is connected to the hydraulic actuating means 34. The supply of power to this means 34 first moves the tapered threader members 35 to the right; thereupon it automatically reverses and moves threader members 35 to the left across the bale case 31 to the position shown in Figure 10.

The threader members 35 and the hydraulic actuating means 34 do not stop in this position shown in full lines in Figure 10 since it will be remembered that the hydraulic actuating means 34 is of the self-reversing reciprocating type. The actuating means 34 thereupon starts a movement toward the right until the dog 76 on the outer member of the actuating means 34 engages the valve rod trigger 77. This action of the dog 76 against the valve rod trigger 77 produces a longitudinal movement of the trip rod 67 so that the valve rod 74 of the valve 49 is again moved to the extreme right hand portion thereby shutting off the supply of pressure fluid to the conduit 79 shown in Figure 4. This movement to the right is relatively small but sufficient to relieve the tension on the wire 109 so that now the operator may actuate the wire chuck 89 against the action of the spring 94, shown in Figure 5, thereby to release the wire.

From this figure it will be seen that the end of the wire 109 which has been removed from the chuck 87 supported on the end of the threader member 35 is twisted so that the end forms a loop. The other end of the baling wire 109 is provided with an upset portion to form a button or knob which is inserted through a longitudinal or elliptical loop at the end of the wire whereupon these two ends of the wires will be locked together thereby tying a bale wire about the bale. At this time then the operator obtains another wire such as 109 from a convenient source of supply which may comprise a container or tube 112 located adjacent to frame 11 of the baling press. This new wire is inserted into the chuck. The compressing plunger 20 however has been moving hay against the threader members 35 thereby causing the entire assembly supported by the frame 33 and mounted on the rods 32 to be moved longitudinally along the bale case or frame 31. To illustrate this action there has been shown in dotted lines such position in Figure 10. As the compressing plunger moves forward the hay being compressed is advanced in the compressing chamber 22 to the bale case 31 and the compressed hay is retained in position by a pair of dogs 111 extending into the sides of the bale case or frame 31 so that the hay will not follow the non-compressing stroke of the plunger 20.

The compressing plunger 20 continues to supply additional hay during the formation of the bale so that eventually the threader assembly will have moved down the bale case a distance which is beyond the dotted line representation of Figure 10. When this occurs the end of the lever 53 engages the dog 63 mounted at an intermediate point on the rod 59. This brings about a rotational movement of the trip rod 67 through the actuation of the lever members 52 and 51. This rotational movement of the trip rod 67 permits the valve rod trigger 77 to be disengaged from the cylinder dog 76 thereby again permitting the spring 73 acting against the collar 72 to produce a longitudinal movement of the trip rod 67. Thus through the link 73' the valve rod 74 of the valve 49 is actuated so as to again permit hydraulic pressure from the source of power to produce actuation of the hydraulic actuating means 34. Thus in response to a predetermined stage of the formation of the bale of hay the means 34 will be thus energized so as to withdraw the threader members 35 thus passing the baling wires 109 across one end of the bale which is being formed. The hydraulic actuating means 34 moves toward the right until the cylinder dog 76 engages the trip rod dog 72 thus producing a longitudinal movement of the trip rod 67 to actuate the valve rod 74 to the right thus shutting off the supply of fluid to the hydraulic actuating means. When the ends of the needle-like threader members 35 have cleared the bale case 31 the entire threader assembly supported from the frame 33 on the rods 32 is moved toward the front of the bale case 31 by the action of the spring 36 so that the carriage is moved to the forward end of the supporting rods 32.

The threader members 35 and the hydraulic actuating means 34 remain inoperative at that point until sufficient hay has been compressed by the hay plunger 20 so that the bale being formed has moved the previously formed bale sufficiently down the bale frame or case 31 so as to actuate the spiked wheel 56 to a point where a stud 57 thereon engages the dog 58 on the shaft 59 to trip or move the lever 53. Actuation of the lever 53 produces rotational movement of the trip rod 67 thus disengaging the dog 72 mounted thereon to permit actuation of the valve rod 74 of the valve 49. The valve 49 therefore is in a condition to supply power to the hydraulic actuating means 34, but this does not produce immediate actuation of the hydraulic actuating means since it will be remembered that the hydraulic source of power is effective following a compressing stroke or during the non-compressing stroke of the plunger 20. Therefore as soon as the compressing plunger 20 has completed a compressing stroke, power will be supplied to the hydraulic actuating means 34 so that the threader 35 is moved across the other end of the bale without interference with the compressed hay which is retained in position by the dogs 111 or by the compressing plunger 20. Thus it will be seen that the source of hydraulic power supplied by the cylinder 39 and the displacement plunger 33 is of intermittent nature effective following a compressing stroke of the piston 20. The intermittent supply of power is further controlled by the valve 49 so that only in response to the formation of the bale or in response to the completion of a bale is the power source permitted to be effective to actuate the automatically reversing hydraulic actuating means 34.

From this it will be seen that but a single operator is needed on the one side of the bale case 31, and that the operator merely has to insert the ends of the baling wires 109 into the chucks 89 and to remove the ends therefrom when the wires have been threaded around the bale. The operator then fastens the ends of the wires together and supplies a new wire end to each chuck. There are no division boards or separation blocks necessary in the operation of this baler, thereby greatly reducing the amount of labor required as compared to other types of baling presses or balers.

While the invention has been shown as applied to a hay and straw combine baler, it of course will be understood that the invention may be applied to stationary baling presses. Furthermore, it will become apparent that while the binding means utilized in the disclosure comprises a baling wire that other binding means such as flexible metal strips and the like having suitable fastening ends may be utilized.

While for the purpose of illustrating my invention, a particular embodiment has been shown, it is to be understood that modifications may be made in the elements employed and in their arrangements without departing from the spirit and scope of my invention as set forth in the appended claims.

What I claim as new and desire to secure by Letters Patent of the United States is:

1. In a baler, the combination comprising a compression chamber having a plunger, a bale frame extending longitudinally from said compression chamber, a plurality of threader members having actuating means for moving said threader members alternately in opposite directions transversely of said frame, means responsive to a predetermined amount of travel of a bale along said frame for causing said actuating means to move said threader members across said frame, said threader members thereupon being moved longitudinally along said frame by successive movements of said plunger, means responsive to a predetermined amount of travel of said threader members along said frame for causing said actuating means to withdraw said threader members from said frame, and means for returning said threader members to their original position along said frame.

2. In a baler, the combination comprising a compression chamber having a plunger, a bale frame extending longitudinally from said compression chamber, a plurality of wire threader members having actuating means for moving said threader members alternately in opposite directions transversely of said frame, a power supply for said actuating means operating to supply power only during a non-compression stroke of said plunger, said threader members being moved longitudinally along said frame by successive movements of said plunger, means responsive to a predetermined travel of said threader members along said frame for causing said actuating means to withdraw said threader members from said frame, means for returning said threader members to the other end of their travel along said frame, and means responsive to the complete formation of a bale for causing said actuating means to move said threader members across said frame.

3. In a baler, the combination of a compression chamber having a reciprocating compression member, a bale frame extending longitudinally from said chamber, a plurality of binding threader members arranged to be positioned across said frame, said threader members having means for receiving the ends of binding material, means for reciprocatingly actuating said threader members, said binding threader members being moved longitudinally along said bale frame as successive operations of said compression member compress material to form a bale, means responsive to a predetermined travel of said threader members along said frame for causing said actuating means to withdraw said threader members from said frame, means for returning said threader members to their initial position along said frame, and means responsive to the completion of a bale of material for causing said actuating means to move said threader members across said frame at the time of a non-compressing stroke of said compressing member thereby to bring the ends of the binding material back to the side of the frame on which the binding material was received by said threader members.

4. In a baler, the combination of a compression chamber having a reciprocating compression member, a bale frame extending longitudinally from said chamber, a plurality of binding threader members arranged to be positioned across said frame, each of said threader members having means for receiving the end of a binding wire, a self-reversing actuating means for said threader members, said theader members being moved longitudinlly along said bale frame as successive movements of said compressing member operate to form a bale, means responsive to a predetermined travel of said threaders along said frame to supply power to said actuating means for a time until said means has begun to reverse its direction of operation, said actuating means thereby operating to withdraw said threader members from said frame, means for returning said threader members to their initial position along said frame, and means responsive to the completion of a bale for supplying power to said actuating means for a time until said actuating means has begun to reverse its direction, said actuating means thereby operating to move said threader members across said frame to bring the ends of the binding wire back to that side of the frame on which the binding wire was received by said threader members.

5. In a baler, the combination of a compression chamber having a reciprocating compressing member, a bale frame extending longitudinally from said chamber, a plurality of binding threader members arranged to be positioned across said frame to receive the ends of binding wire, said threader members being moved along said frame by successive movements of said compressing member to compress material to form a bale, self-reversing actuating means for said threader, means for supplying power to said latter means during a non-compression stroke of said compressing member, means responsive to a predetermined travel of said threader members along said frame to supply power to said actuating means until just after said means has begun to reverse the direction of movement of said threader members thereby to withdraw said threader members from said frame, means for returning said threader members to their initial position along said frame, and means responsive to the completion of a bale for supplying power to said actuating means until just after said means has begun to reverse the direction of said threader members thereby to move said threader members across said frame to bring the ends of the binding wire back to that side of the frame on which the binding wire was received by said threader members.

6. The combination in a baler comprising a baling wire threader, a bale case, power means for moving said threader transversely with respect to said bale case, means mounting and permitting said threader to be moved longitudinally along said case during the formation of a bale, means responsive to the movement of a bale for controlling said power means to withdraw said threader from said case and to permit said threader to return to the back of a bale, and means responsive to the formation of a bale for controlling said power means to move said threader across said case at the rear of a bale.

7. The combination in a baler comprising a baling wire threader, a bale case, power means for moving said threader transversely with respect to said bale case, means mounting and permitting said threader to be moved longitudinally along said case during the formation of a bale, means responsive to the movement of a bale for controlling said power means to withdraw said threader from said case and to permit said threader to return to the back of a bale, and means responsive to the completion of a bale for controlling said power means to move said threader across and beyond said case, and to partially reverse said movement of said threader to reduce the tension on the baling wire.

8. In a baler the combination of a bale frame and a plurality of threader members for threading binding wire about the bale, said threader members each having a tapered elongated configuration terminating with means for receiving the end of a binding wire, self-reversing actuating means for moving said threader members transversely of said frame, a source of power therefor, means located adjacent said frame for supporting said threader members and said actuating means so as to permit said threader members to be moved longitudinally along said frame, means responsive to a predetermined movement of said threader members along said frame for supplying power to said actuating means for a period sufficient to withdraw said threader members from said frame and for said actuating means to begin reverse operation, means thereupon operative to return said threader members to their initial starting position along said frame, and means responsive to the completion of a bale for supplying power to said actuating means for a period sufficient to move said threader members across and beyond said frame and for said actuating means to begin reverse operation thereby to bring the ends of the binding wire back to that side of the frame on which it was received and to relieve partially the tension on said wire to permit removal thereof from said threader means.

9. The combination in a baler, of a plunger cooperating with a material compressing chamber, hydraulically operated means for passing baling wire about a bale of material, a source of power for said means including a source of fluid and a pump, means coordinating the operation of said pump so as to be operative to supply power to said first means only during a non-compressing stroke of said plunger, valve means for selectively permitting fluid from said pump to be returned to said source without substantial loss of energy and for permitting fluid from said pump to supply power to said hydraulically operated means, and means responsive to the formation of a bale of material for controlling said valve means.

10. In a baler having a plunger for compressing material, the combination of means for passing baling wire about a bale of material, automatically reversing fluid operated means for reciprocatingly actuating said first means, a source of power for said fluid operated means including a pump connected to said plunger, said pump being intermittently effective to supply power, and means responsive to the formation of a bale of material for determining the effective periods of said pump.

11. In a baler having a plunger for compressing material, the combination of means for passing baling wire about a bale of material, fluid operated means for reciprocatingly actuating said first means, a source of power for said fluid operated means including a pump, said pump being intermittently effective to supply power, means coordinating the operation of said pump so as to be effective to supply power after a compressing stroke of said plunger, and means responsive to the formation of a bale of material for determining the effective periods of said pump.

12. In a baler having a plunger for compressing material, the combination of means for threading baling wire about a bale of material, fluid operated means for reciprocatingly actuating said first means, said plunger causing said fluid operated means to be actuated in a direction transverse to said reciprocating direction, a source of power for said fluid operated means including a pump intermittently effective to supply power, means connected between said plunger and said pump whereby said pump will supply power only during a non-compressing stroke of said plunger, and means responsive to the formation of a bale of material for determining the effective operating periods of said pump.

13. In a baler provided with a source of power, the combination comprising a compression chamber, a plunger therefor, a bale case connected to said chamber, a plurality of threader members arranged for movement longitudinally along and transversely of said bale case to move bale binding material along opposite sides of and across the ends of a bale, actuating means for moving said threader members transversely of said bale case, means responsive to predetermined movements of a bale along said case to control the supply of power to said actuating means to produce transverse movement of said threader member with respect to said case, and means for supplying power to said actuating means after a compression stroke of said plunger.

14. In a baler, the combination comprising a compression chamber having a plunger, a bale frame connected to said compression chamber and extending longitudinally therefrom, a plurality of threader members, said threader members being arranged for movement longitudinally along said frame in response to successive movements of said plunger to move bale binding material along one side of the bale, actuating means for said threader members for moving said members transversely of said bale frame to move said baling material across the ends of said bale, a source of power for said actuating means, said source operating to supply power only during a rearward movement of said plunger, and means responsive to predetermined movement of said bale along said frame to control the supply of power to said actuating means to produce transverse movement of said threader members with respect to said frame.

15. The combination in baler, of a plunger for compressing material to form a bale, a base case, means transversely and longitudinally movable with respect to said case for threading baling wire completely around a bale, an intermittently operative source of power for said means, means responsive to the formation of a bale for controlling the supply of power from said source of said first means, and means for coordinating the operation of said power source so as to supply power to said first means only during a non-compressing stroke of said plunger.

16. In a baler, the combination comprising a compression chamber having a plunger, a bale frame connected to said compression chamber and extending longitudinally therefrom, a plurality of threader members for threading binding material about a bale, said threader members being arranged for movement longitudinally along said frame in one direction in response to successive movements of said plunger, energy storage means for returning said threader members longitudinally along said frame, actuating means for moving said threader members alternately in opposite directions transversely of said bale frame, a source of power for said actuating means, said source operating to supply power only during the rearward movement of said plunger, and means responsive to predetermined movement of a bale along said frame to control the supply of power to said actuating means to produce transverse movement of said threader members with respect to said frame.

DOUGLAS JOHNSTON.